Patented Sept. 19, 1939

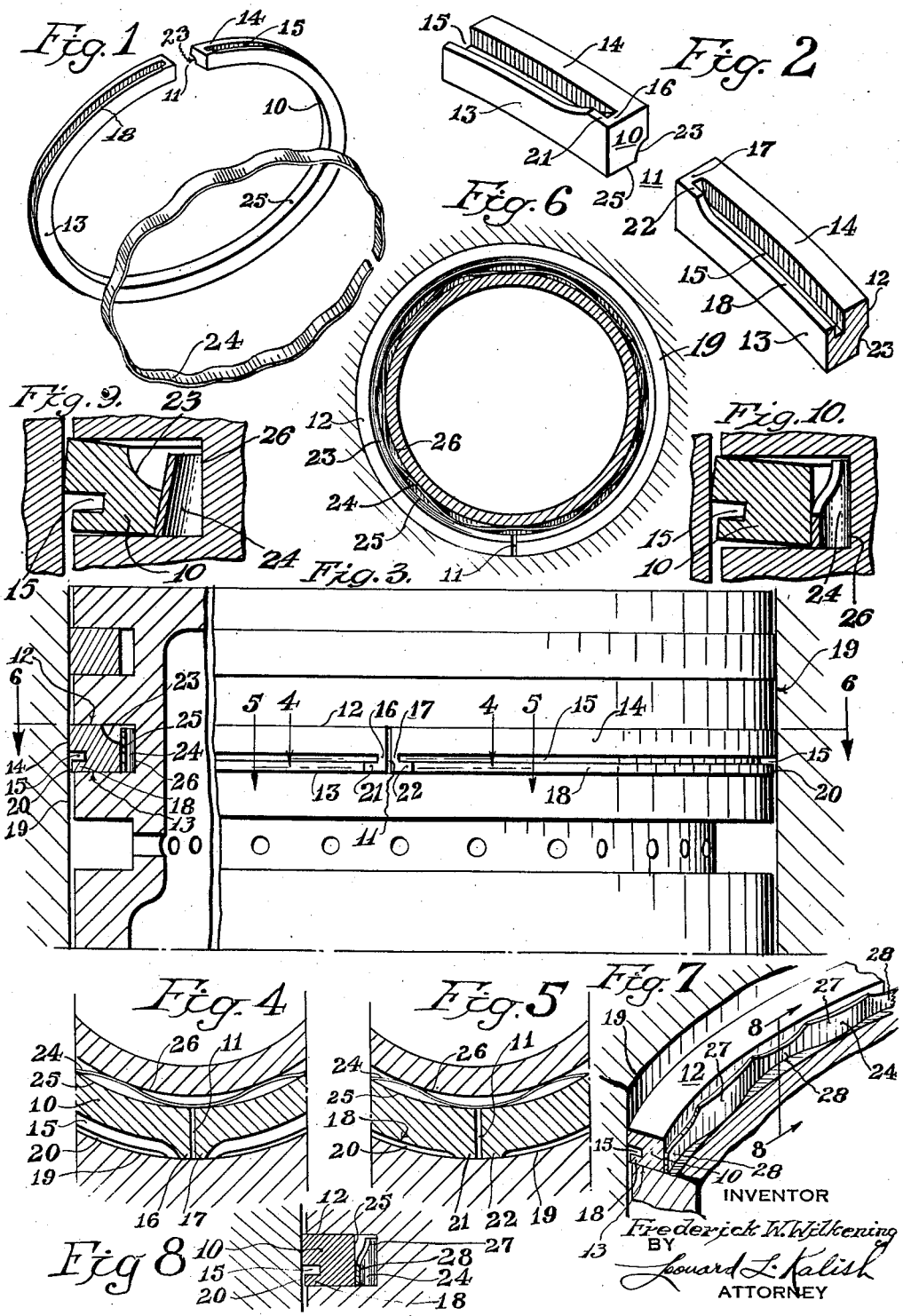

2,173,190

UNITED STATES PATENT OFFICE 2,173,190

PISTON RING

Frederick W. Wilkening, Narberth, Pa.

Application February 4, 1937, Serial No. 124,028

14 Claims. (Cl. 309—45)

The present invention relates to a certain new and useful piston ring and it relates more particularly to piston rings for both compression as well as oil control.

This application is a continuation in part of an application for a Piston ring, filed March 12, 1935, and bearing Serial Number 10,612.

The present invention relates to a new and useful piston ring construction, and relates more particularly to a piston ring construction adapted for use in maintaining compression, and also to prevent a "blow-by", and to serve in a measure as a means of controlling the oil on the cylinder surface.

The object of the present invention is to provide means whereby a reservoir of oil is maintained at all times in the piston ring, which tends to fill up on the down stroke and tends to "payout" on the up stroke, thereby tending to form an oil-seal in addition to the normal seal between the ring and the cylinder wall.

Another object of the present invention is to provide a more intense cylinder-contact, and one which will "set" more readily or conform to the cylinder more readily particularly, for instance, in worn cylinders or out-of-round cylinders; thereby to insure a greater sealing capacity for the maintenance of compression and also to increase the capacity of the ring for scraping the oil in the downward direction.

With the above and other objects in view, which will appear more fully from the following description and accompanying drawing, the present invention consists of a radially expansible annular metallic sealing member or ring, having an outer cylindrical cylinder-contact surface, and having an outer peripheral portion beneath its cylinder-contact surface which is set back slightly from the diameter of the cylinder-contact surface or is "relieved" slightly so that it does not contact with the cylinder, but forms in conjunction with the cylinder surface an annular space or an annular receiving chamber or passageway which is relatively narrow radially; being just sufficiently wide to let in a layer of oil or amply to "clear" the oil film or layer which may adhere to the cylinder wall (and which oil film is thereby encountered by the piston ring on the down stroke), and an annular oil chamber disposed above and extending radially inwardly from said relatively narrow annular receiving passageway and formed in communication therewith and closed near the "split" in the ring so that the oil therefrom cannot drain out directly into the "gap" of the ring.

The present invention further consists in a trans-split or interrupted annular metallic piston ring for use in one or more of the ring-receiving grooves of a piston of an internal combustion engine or the like (preferably, though not necessarily, the uppermost ring-receiving groove or grooves) having a generally annular oil-collecting chamber in its outer periphery near its lower side wall and a relatively narrower recessed portion beneath said generally annular oil-collecting reservoir for the ingress and egress of the oil into and from said oil-collecting reservoir; said generally annular oil collector reservoir as well as said narrower recessed portion each terminating short of the gap of the piston ring on either side of said gap, an annular chamfer at an inner corner of the piston ring diagonally opposite to the aforesaid outer recessed portion, and an expander spring bearing against the inner periphery of said piston ring and urging it outwardly.

The present invention consists of certain other novel features and details of construction, all of which will appear more fully from the following detailed description and accompanying drawing.

For the purpose of illustrating the invention, there is shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawing in which like reference characters indicate like parts:

Figure 1 represents a perspective view of a piston ring and expander-spring combination, showing one embodiment of the present invention.

Figure 2 represents a fragmentary enlarged perspective view of the piston ring member of the embodiment shown in Figure 1, showing the two end portions thereof immediately adjacent to the gap.

Figure 3 represents a fragmentary sectional view of a piston and cylinder, and of the piston ring and expander-spring combination of the embodiment of the present invention, shown in Figures 1 and 2, shown in operative relation to the piston and the cylinder wall.

Figure 4 represents a section on line 4—4 of Figure 3.

Figure 5 represents a section on line 5—5 of Figure 3.

Figure 6 represents a section on line 6—6 of Figure 3 on a reduced scale.

Figure 7 represents a fragmentary perspective view of another or modified embodiment of the present invention wherein, instead of the inner chamfer, the ring-receiving portions of the expander spring are cut away or removed at the top so that the spring will bear against only the lower portion of the inner periphery of the ring member or will not bear against the uppermost portions thereof.

Figure 8 represents a section on line 8—8 of Figure 7.

Figure 9 represents an enlarged transverse sectional view taken through the piston ring and expander combination of the embodiment shown in Figures 1, 2 and 3, and shows in a more or less exaggerated manner the "dished" or "twisted" position assumed by the piston ring when operatively positioned within the ring-receiving groove of the piston.

Figure 10 represents an enlarged transverse sectional view taken through the piston ring and expander combination of the modified embodiment shown in Figures 7 and 8 and shows in a more or less exaggerated manner the "dished" or "twisted" position assumed by the piston ring when operatively positioned within the ring-receiving groove of the piston.

According to the present invention, an annular metallic piston ring member 10 is "split" at any suitable point, as at 11, and is thereby adapted for radial expansion so that it may be expanded over the piston and thus be mounted in a ring-receiving groove thereof and thereby also adapted for the limited expansion and contraction required of the piston ring during its actual operation to conform to the cylinder. The annular metallic ring member 10 is self-tensioned by any suitable method, as for instance, by the method disclosed in United States Patent No. 1,996,603 or by any other method by which tension may be imparted to the ring which would tend to expand it, as for instance, by casting the ring members "out-of-round" and removing from the "out-of-round" casting a suitable small section sufficient to permit of the collapsing of the ring to a generally circular form under the influence of contacting forces suitably applied and then machining some or all of the surfaces of the piston ring member, but at least the cylinder-contact surface thereof while the ring is in such collapsed condition.

The ring is shown generally in the collapsed position in Figures 3, 4, 5 and 6 and in the expanded condition in Figures 1 and 2. The ring is preferably provided with plane parallel side walls 12 and 13, and an outer cylindrical cylinder-contact surface 14 adjacent to its upper side wall 12 and of an axial width substantially less than the over-all axial width of the ring. Immediately beneath the cylindrical cylinder-contact surface 14 an annular chamber 15 is provided extending inwardly in a generally radial direction, said chamber terminating at its two ends slightly in advance of the gap 11, that is, adjacent to the gap, as indicated at 16 and 17, so that it does not directly communicate with the gap 11. Immediately beneath the chamber 15, a slightly "undercut" or "relieved" cylindrical or other suitable (or for instance, tapered with the reduction in diameter preferably downwardly) surface 18 is formed which is therefore spaced a slight distance from the cylinder wall 19 of the engine, as indicated particularly in Figures 2 and 3 when in operative relation to the piston and cylinder, whereby an annular passageway 20 of small radial dimension is formed between the relieved surface 18 and the cylinder wall 19. If desired, the direct communication between the annular passageway 20 and the gap 11 may also be interrupted or broken by continuing or carrying the cylindrical cylinder-contact surface 14 down to the lower side wall 13 of the ring along the narrow terminal zones 21 and 22, immediately adjacent to the gap 11.

In the embodiment of the present invention shown particularly in Figures 1, 2, 3 and 6, a generally annular chamfer 23 is provided at the corner of the cross-section of the ring member which is generally diagonally opposite to the recessed surface 18; preferably of a slightly arcuate cross-section or preferably of a "fillet" type.

A radial expander spring 24 preferably of the ribbon type, either of the generally sinuous corrugated form or of a polygonal form, is interposed between the inner surface 25 of the piston ring member and the innermost wall 26 of the ring-receiving groove so as to exert a circumferentially distributed outward radial pressure upon the piston ring member to supplement and augment the outward force thereof due to the inherent tension of the ring member. The spring 24 may be of any suitable construction, as for instance, that shown generally in the drawing or may be of the general type exemplified in United States Patent No. 1,727,298 to Miller, or of the type exemplified in co-pending application Serial No. 10,385 filed March 11, 1935.

In the embodiment of the present invention illustrated generally in Figures 7 and 8 (and to which Figures 4 and 5 are also applicable) instead of reducing the axial width of the inner peripheral surface of the ring member 10 by the inner upper chamfer 23, so as to cause the expander spring 24 to bear against the ring more at the bottom and less at the top, the ring contact portions or the outer contact portions 28 of the expander spring 24 may be reduced in width by cutting out the upper portions thereof as indicated in Figures 7 and 8; the remaining and inwardly extending piston-contact portions 27 being left in their original width, that is, the approximate width of the ring-receiving groove so that the spring will always maintain its position in the ring-receiving groove and will not be permitted to wander up and down or axially of the ring-receiving groove to any harmful extent.

In both the embodiments of the present invention, the expander spring 24 will not bear against the uppermost portion of the inner periphery of the ring member 10 so as to cause the cylindrical cylinder-contact surface 14 to bear against the cylinder wall 19 more firmly at the lower portion thereof than at the upper portion thereof; in this manner making a more intense contact between cylinder wall 19 and cylinder-contact surface 14 at the zone immediately adjacent to the oil collector channel 15 so as more effectively to scrape the oil thereinto.

The piston ring construction of the present invention may be installed in any one or more of the several ring-receiving grooves of a piston above the lowermost ring-receiving groove; the lowermost ring receiving groove being preferably reserved for a draining-type oil-control piston ring.

Thus, the piston ring construction of the present invention may be provided in one or more of the upper ring-receiving grooves of each piston of a gasoline engine; being intended particularly for the modern high-speed and high-compression engine. In Figure 3 one of these piston rings with expander is shown mounted in one of the upper ring-receiving grooves, while in the uppermost ring-receiving groove a conventional "square" or "plain" piston ring is shown. It is to be understood that the piston ring construction of the present invention may be provided in two or more of the upper ring-receiving grooves and may replace all conventional "compression" rings on a piston.

If desired, the piston ring may be so tensioned, as for instance by the heat-shaping method above referred to, as to assume a plane position when collapsed in the operative position, or it may be so tensioned, also by heat-shaping, for instance, as to assume a slightly "dished" position when collapsed in the operative position, that is, so as to be slightly twisted in cross section so that the uppermost portion of the cylindrical cylinder-contact surface of the piston ring will tend to recede slightly (perhaps to the extent of a thousandth of an inch) from the cylinder wall, while the lowermost portion of the cylindrical cylinder-contact surface only tends to contact the cylinder wall; the cylindrical cylinder-contact surface of the piston ring being therefore disposed at a very slight angle to the cylinder surface. Whether the piston ring will tend to assume a plane condition when collapsed (with both upper and lower portions of the cylinder-contact surface bearing against the cylinder surface more or less equally), or whether it will tend to assume a slightly "dished" position when collapsed (with the lower cylinder-contact portion bearing against the cylinder somewhat more than the upper portion or with the upper portion slightly receded) may be determined by the relative sequence of heat-shaping and channeling or grooving the ring. Thus, depending on whether the relieving as at 18, and the formation of the annular chamber 15 is accomplished before or after heat-shaping, the ring may be made to assume a plane or a slightly "dished" formation when collapsed.

In the preferred embodiment of the present invention, the sequence of operations is so arranged that the piston ring member 10 will be slightly dished when collapsed to the cylinder diameter. Thus, if the inherent radially expansive tension of the ring is produced by "heat-shaping" then the ring member is first machined on its sides and on its outermost (and innermost diameter if the latter is also to be machined) periphery and then split and expanded and heat-shaped in the expanded position, and then collapsed to the cylinder diameter and clamped in such collapsed position and then grooved to produce the oil collector channel 15 and to produce the relieved surface 18.

In providing the inner chamfer 23, the same may be provided either by casting the chamfer directly into the individual ring or by machining the chamfer into the ring initially cast with the square corner. This may be accomplished both in piston rings in which the inherent radially expansive tension is produced by "heat-shaping", or in piston rings in which such tension is produced by the so-called "out-of-round" method.

In producing the ring of the present construction by "heat-shaping", the individual rings may be cast in their generally circular form with the chamfer cast in the corner and the rings fully machined in their uninterrupted circle, that is, the two plane parallel side walls machined and the outer diameter machined and the inner diameter machined also if the inner periphery is to be finished, and the outer oil collector groove or chamber 15 and relieved surface 18 likewise machined. Thereafter, the ring is "split" by a suitable narrow saw cut intermediate the two ends of the oil collector chamber 15 and the relieved surface 18 so as to leave this chamber and this relieved surface "dammed" on either side of the gap of the ring, and thereafter the ring is expanded by more or less tangential forces applied to the split ends of the ring to the desired extent.

While kept in this expanded condition by interposing a spacer member between the juxtaposed ends of the ring, the ring is clamped sidewise or in a generally axial direction between two clamping members having complementary conical surfaces so as to dish the ring in the desired direction. This may be done by clamping a multiplicity of such rings between two conical end members; the intervening rings exerting a similar dishing effect upon each other. The ring is then heated to rob the metal of the stresses set up by the forced expansion and then cooled. Upon cooling, the normal "set" of the ring is in the expanded position and upon a forced collapsing of the ring to cylinder diameter, not only is an inherent outward radially expansive tension produced in the ring, but a slight dishing is also thus produced in the desired direction. As stated, however, if desired, the inner chamfer 23 may be machined instead of being cast.

In producing the radially expansive tension in the ring 10 by the out-of-round method, the chamfer may either be produced by turning or may be cast to shape in the individual out-of-round cast, and in the latter event, it may be left unfinished without machining.

The following is a typical set of dimensions or relative proportions found desirable for nominally eighth-inch wide piston rings embodying the present invention, of from two and seven-eighths to four inches in diameter (the diameters commonly used for passenger automobile engines):—

(1) The over-all radial thickness of the piston ring will vary from about eleven-hundredths (.110″) of an inch for a two and seven-eighths (2⅞) inch diameter ring to about sixteen-hundredths (.160″) of an inch for a three and seven-eighths (3⅞) inch diameter or four inch diameter piston ring.

(2) The radial depth of the annular oil collector chamber or reservoir 15 may be more or less approximately four-hundredths (.040″) of an inch, while its axial width may be more or less approximately two-hundredths (.020″) of an inch.

(3) The radial distance of the "relieved" surface 18 from the cylinder surface 19 may be more or less approximately two-hundredths (.020″) of an inch, while the axial width of said surface 18 may also be more or less approximately two-hundredths (.020″) of an inch.

(4) The chamfer may extend in a radial direction on the side wall of the ring to more or less approximately four-hundredths (.040″) of an inch and may extend axially along the innermost wall of the ring a distance of more or less approximately five-hundredths (.050″) of an inch.

While these relative dimensions or proportions have been found desirable, they are subject to variations; particularly so if the over-all cross-sectional dimensions of the ring change, as for instance, in the case of nominally five-thirty-seconds of an inch wide piston ring or in the case of a nominally three-sixteenths of an inch wide piston ring. While the radial dimension of the chamber 15 and the radial "relief" of the surface 18 may remain more or less the same, the axial dimensions of these proportions as well as the dimensions of the chamfer would vary in proportion to the width of the piston ring or the width of the ring-receiving groove in which the piston ring is intended to function.

It is to be understood that the foregoing dimensions are given merely for purposes of exemplification and not by way of restriction.

In actual operation, the piston ring of the present invention tends to gather and entrap oil in the annular chamber 15 on the down stroke and to pay out against the cylinder wall some of this entrapped oil on the up stroke of the piston. As the distance between the relieved surface 18 and the cylinder wall is slightly greater than the thickness of the oil film, the oil film can readily pass through this annular clearance or this annular passageway until it reaches the chamber 15 where it is collected. On the down stroke the oil film is forced into or is crowded into the chamber 15 by virtue of the speed with which the piston ring meets the oil film; the crowding of the oil into the chamber 15 being therefore due more to impact from the high speed. On the up stroke however, the "paying-out" of the oil is not influenced by this same impact of the piston ring against the oil film, but is influenced largely by the adhesion of the oil to the cylinder surface. This latter influence being of a lesser magnitude than the influence of the impact of the piston ring against the oil film, the tendency is to build up and maintain a supply of oil in the reservoir 15 under some pressure; that is, to crowd the oil at all times into the chamber 15 when the engine is in actual operation. This in turn creates an oil-seal which becomes most intense as the speed of the engine is increased.

The "dishing" or "twisting" due to the oil-collector groove 15 and due to the relieved surface 18, is augmented by the dishing produced by the chamfer 23 and expander spring 24 as illustrated in Figure 9, or produced by the expander spring 24 without the chamfer 23 as in Figures 7, 8 and 10, which spring in either embodiment of the invention engages the lower portion of the piston ring member more prominently than the upper portion, so as to tend to expand the ring more at the bottom than at the top. This serves to increase the differential of cylinder-contact pressure between the bottom and top of the cylinder-contact surface 14.

The "dishing" or "twisting" due to the annular chamber 15 and the relieved portion 18 in the lower outer corner of the ring may be augmented by such "dishing" or "twisting" produced in the "heat-shaping" of the ring, so as to present a firmer contact between ring and cylinder wall at the bottom of the ring than at the top of the ring, or indeed the desired "dishing" or "twisting" of the ring, can be produced by any one of the several variant heat-shaping processes above referred to wholly irrespective of any asymmetrical removal of metal from the ring cross section. Thus, by heat-shaping, any predetermined twist or dish can be produced regardless of or notwithstanding the twist or dish occasioned by any asymmetry of the cross section of the ring.

While, as hereinabove pointed out, the expander spring used for intensifying the contact at the bottom of the ring as against the top of the ring can be made to exert itself asymmetrically with respect to the median plane of the ring by either of the two embodiments shown particularly in Figures 1 and 3 on one hand and Figures 7 and 8 on the other hand, yet in some respects the asymmetrical spring contact shown particularly in Figures 1 and 3 is preferable to that shown in Figures 7 and 8, because in the production of flat steel ribbon springs, the cutting out of the notches at the top to produce the narrowed portions 28 shown in Figures 7 and 8, necessitates from a practical manufacturing standpoint, stamping the notches out after the spring steel has been hardened, and the stamping of hardened steel while entirely feasible carries with it some hazards of an occasional fracture in the steel along the cut edge, that is, along the reduced portion. Thus, while the tempered steel band can be stamped along one edge thereof to produce the narrowed portion 28, yet occasionally a very slight and sometimes hardly perceptible fracture occurs in the tempered steel which may later enlarge so as ultimately to cause a complete break in the spring at that point. As against this, the asymmetrical contact method shown in Figures 1 and 3 may be preferable, although both methods are feasible and produce satisfactory results.

It is to be understood that while in the drawing no lateral axial clearance has been shown between the ring member 10 and the side walls of the ring-receiving groove, yet there is a slight clearance in actual practice, and the reason for not showing this in the drawing is that the minimum clearance that could possibly be shown in a drawing of the present scale would necessarily represent a gross exaggeration of the actual clearance because the actual clearance involves only a few thousandths of an inch; these clearances being of common knowledge in the art. Likewise, it is to be understood that the clearances shown between the piston and cylinder are also much exaggerated and these clearances in actual practice would not in fact be of the proportions shown in the drawing. These clearances between piston and cylinder are likewise a matter of common knowledge in the art.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A piston ring adapted for use in internal combustion engines and adapted to be disposed within the ring-receiving groove of a piston, said piston ring comprising a trans-split annular ring member having side walls, an oil-collector groove in the outer lower peripheral corner of said ring member, and a radial expander spring associated with said annular ring member and adapted for operative interposition between the inner periphery of said ring member and the innermost wall of the ring-receiving groove of the piston and arranged to exert a circumferentially distributed outward radial pressure upon said ring member asymmetrically with respect to the median plane thereof, whereby said ring will be dished when operatively positioned in said ring-receiving groove.

2. A piston ring adapted for use in internal combustion engines and adapted to be disposed within the ring-receiving groove of a piston, said piston ring comprising a trans-split annular ring member having side walls, an oil-collector groove in the outer lower peripheral corner of said ring member, and a radial expander spring associated with said annular ring member and adapted for operative interposition between the inner periphery of said ring member and the innermost wall of the ring-receiving groove of the piston and having an overall axial width approximately that of the axial width of the ring-receiving groove arranged to exert a circumferentially distributed outward radial pressure upon said ring member asymmetrically with respect to the median plane thereof; the radial expansive force exerted upon said ring member by said spring being greater at the bottom of the ring member than at the top of the ring member.

3. A piston ring adapted for use in internal combustion engines and adapted to be disposed within the ring-receiving groove of a piston, said piston ring comprising a trans-split annular ring member having side walls, an oil-collector groove in the outer lower peripheral corner of said ring member, and a radial expander spring associated with said annular ring member and adapted for operative interposition between the inner periphery of said ring member and the innermost wall of the ring-receiving groove of the piston and having an overall axial width approximately that of the axial width of the ring-receiving groove arranged to exert a circumferentially distributed outward radial pressure upon said ring member asymmetrically with respect to the median plane thereof, said ring member and said expander spring being so related to each other as not to contact each other along the portions thereof nearest the head of the piston.

4. A piston ring adapted for use in internal combustion engines and adapted to be disposed within the ring-receiving groove of a piston, said piston ring comprising a generally imperforate, trans-split annular ring member approximately that of the width of the ring-receiving groove and disposed therein and having a generally continuous inner annular circumference uninterrupted except at the gap, and a radial expander spring associated with said annular ring member and disposed between the inner periphery of the ring member and the innermost wall of the ring receiving groove and also of a width approximately that of the width of the ring-receiving groove and exerting a circumferentially distributed outward radial pressure upon the ring member asymmetrically with respect to the median plane thereof and with the greater pressure exerted farthest from the head of the piston.

5. A piston ring adapted for use in internal combustion engines and adapted to be disposed within the ring-receiving groove of a piston, said piston ring comprising a generally imperforate, trans-split annular ring member approximately that of the width of the ring-receiving groove and disposed therein and having a generally continuous inner annular circumference uninterrupted except at the gap, and a radial expander spring associated with said annular ring member and disposed between the inner periphery of the ring member and the innermost wall of the ring receiving groove and of a width approximately that of the width of the ring-receiving groove and exerting a circumferentially distributed outward radial pressure upon the ring member asymmetrically with respect to the median plane thereof, said ring member and said expander spring being so arranged and related as not to contact each other along the portions thereof nearest the cylinder head.

6. A piston ring adapted for use in internal combustion engines and adapted to be disposed within the ring-receiving groove of a piston, said piston ring comprising a trans-split annular ring member having side-walls, an outer generally cylindrical cylinder-contact surface generally adjacent the side-wall nearest the combustion chamber of the engine, a generally annular surface of a diameter slightly less than said cylinder-contact surface adjacent the other side-wall of the ring member and spaced axially from said cylinder-contact surface and a generally annular oil reservoir disposed generally intermediate said cylinder-contact surface and said annular surface of slightly less diameter, said generally annular oil reservoir terminating on each side of the split in the ring member, and said last-mentioned annular surface of slightly less diameter also terminating on each side of said split in said ring, and a generally annular chamfer on the inner periphery of the ring member diagonally opposite to said last-mentioned annular surface.

7. A piston ring adapted for use in internal combustion engines and adapted to be disposed within the ring-receiving groove of a piston, said piston ring comprising a trans-split annular ring member having generally plane parallel side walls, an outer cylindrical cylinder-contact surface generally adjacent the side-wall nearest the combustion chamber of the engine, a generally annular surface of a diameter slightly less than said cylinder-contact surface adjacent the other side-wall of the ring member and spaced axially from said cylinder-contact surface and a generally annular oil reservoir disposed generally intermediate said cylinder-contact surface and said annular surface of slightly less diameter, and a generally annular chamfer on the inner periphery of the ring member diagonally opposite to said last-mentioned annular surface.

8. A piston ring for internal combustion engines comprising a trans-split annular member adapted to be disposed within the ring-receiving groove of the piston and to bear against the cylinder wall;—said piston ring having an upper cylindrical cylinder-contact surface adjacent its upper side-wall of an axial width substantially less than the over-all axial width of the ring member, a generally annular oil reservoir extending radially inwardly into said ring member immediately beneath said cylinder-contact surface; the upper side-wall of said reservoir intersecting said cylindrical cylinder contact surface, and said annular reservoir terminating on either side of the split in the ring and a short distance therefrom, and a generally annular surface beneath said reservoir and of a diameter slightly less than the diameter of the cylinder-contact surface so as to be set back slightly from the cylinder wall in the operative condition of the piston ring, and so as to form with the cylinder wall a slight annular passageway leading to said generally annular oil reservoir, and a generally annular chamfer on the inner periphery of the ring member diagonally opposite to said last-mentioned annular surface.

9. A piston ring adapted for use in internal combustion engines comprising a trans-split annular member adapted to be disposed within the ring-receiving groove of a piston and to bear against the cylinder wall, said ring member having a generally annular oil reservoir extending thereinto in a generally radial direction and terminating a slight distance on either side of the split in the ring, said reservoir being spaced inwardly from each of the two side-walls of the ring member, and extending outwardly to the cylinder wall in a generally radial direction, and a generally annular relieved surface intermediate said oil reservoir and the lower side-wall of the ring member adapted to form with the cylinder wall a slight annular passageway leading to said oil reservoir, and a generally annular chamfer on the inner periphery of the ring member diagonally opposite to said last-mentioned annular surface.

10. A piston ring adapted for use in internal combustion engines and adapted to be disposed within the ring-receiving groove of a piston, said piston ring comprising a trans-split annular ring member having side-walls, an outer generally cylindrical cylinder-contact surface generally adjacent the side-wall nearest the combustion chamber of the engine, a generally annular surface of a diameter slightly less than said cylinder-contact surface adjacent the other side-wall of the ring member and spaced axially from said cylinder-contact surface and a generally annular oil reservoir disposed generally intermediate said cylinder-contact surface and said annular surface of slightly less diameter, said generally annular oil reservoir terminating on each side of the split in the ring member, and a generally annular chamfer on the inner periphery of the ring member diagonally opposite to said last-mentioned annular surface.

11. A piston ring adapted for use in internal combustion engines and adapted to be disposed within the ring-receiving groove of a piston, said piston ring comprising a trans-split annular metallic ring member having an outer cylindrial cylinder-contact surface of a width less than the overall width of the piston ring and nearer to one side thereof, a generally annular oil reservoir intermediate said cylinder-contact surface and the other side of the piston ring and spaced axially inwardly from said last-mentioned side of the piston ring, an oil-retaining shelf spaced axially inwardly from said last-mentioned side of the piston ring, constituting the wall of said oil reservoir nearest said last-mentioned side of the piston ring, and a generally annular portion intermediate said oil-retaining shelf and said last-mentioned side of the piston ring having a diameter less than the diameter of said cylinder-contact surface and greater than the diameter of the radially-innermost wall of said oil-reservoir; said generally annular oil-reservoir and said last-mentioned generally annular portion each terminating short of the split in the piston ring, and an expander spring associated with said annular ring member and adapted for operative interposition between the inner periphery of said ring member and the innermost wall of the ring-receiving groove of the piston and having an overall axial width approximately that of the axial width of the ring-receiving groove and arranged to exert a circumferentially distributed outward radial pressure upon said ring member asymmetrically with respect to the median plane thereof.

12. A piston ring adapted for use in internal combustion engines and adapted to be disposed within the ring-receiving groove of a piston, said piston ring comprising a trans-split annular metallic ring member having an outer cylindrical cylinder-contact surface of a width less than the overall width of the piston ring and nearer to one side thereof, said ring member being capable of radial contraction sufficient to permit the contraction of said cylinder-contact surface to the diameter of the piston, a generally annular and imperforate oil reservoir intermediate said cylinder-contact surface and the other side of the piston ring and spaced axially from said last-mentioned side of the piston ring, an oil-retaining shelf spaced axially from said last-mentioned side of the piston ring, constituting the wall of said oil reservoir nearest said last-mentioned side of the piston ring, and a generally annular portion intermediate said oil-retaining shelf and said last-mentioned side of the piston ring having a diameter less than the diameter of said cylinder-contact surface and greater than the diameter of the radially-innermost wall of said oil-reservoir, and a generally annular chamfer at the inner peripheral corner of the ring member adjacent the side of the ring to which the cylinder-contact surface is adjacent.

13. A piston ring adapted for use in internal combustion engines and adapted to be disposed within the ring-receiving groove of a piston, said piston ring comprising a trans-split annular metallic ring member having an outer cylindrical cylinder-contact surface of a width less than the overall width of the piston ring and nearer to one side thereof, said ring member being capable of radial contraction sufficient to permit the contraction of said cylinder-contact surface to the diameter of the piston, a generally annular and imperforate oil reservoir intermediate said cylinder-contact surface and the other side of the piston ring and spaced axially from said last-mentioned side of the piston ring, a dam in said generally annular oil reservoir, an oil-retaining shelf spaced axially from said last-mentioned side of the piston ring, constituting the wall of said oil reservoir nearest said last-mentioned side of the piston ring, and a generally annular portion intermediate said oil-retaining shelf and said last-mentioned side of the piston ring having a diameter less than the diameter of said cylinder-contact surface and greater than the diameter of the radially-innermost wall of said oil-reservoir, and a generally annular chamfer at the inner peripheral corner of the ring member adjacent the side of the ring to which the cylinder-contact surface is adjacent.

14. A piston ring adapted for use in internal combustion engines and adapted to be disposed within the ring-receiving groove of a piston, said piston ring comprising a trans-split annular metallic ring member having an outer cylindrical cylinder-contact surface of a width less than the overall width of the piston ring and nearer to one side thereof, said ring member being capable of radial contraction sufficient to permit the contraction of said cylinder-contact surface to the diameter of the piston, a generally annular and imperforate oil reservoir intermediate said cylinder-contact surface and the other side of the piston ring and spaced axially from said last-mentioned side of the piston ring terminating at a suitable distance from the split in the piston ring, an oil-retaining shelf spaced axially from said last-mentioned side of the piston ring, constituting the wall of said oil reservoir nearest said last-mentioned side of the piston ring, and a generally annular portion intermediate said oil-retaining shelf and said last-mentioned side of the piston ring having a diameter less than the diameter of said cylinder-contact surface and greater than the diameter of the radially-innermost wall of said oil-reservoir, and a generally annular chamfer at the inner peripheral corner of the ring member adjacent the side of the ring to which the cylinder-contact surface is adjacent.

FREDERICK W. WILKENING.